US011898741B1

(12) United States Patent
CHEN

(10) Patent No.: US 11,898,741 B1
(45) Date of Patent: Feb. 13, 2024

(54) INDIRECT LIGHTING FIXTURES WITH SYMMETRICAL LIGHT SOURCE

(71) Applicant: XIONG CHEN, Irvine, CA (US)

(72) Inventor: XIONG CHEN, Irvine, CA (US)

( * ) Notice: Subject to any disclaimer, the term of this patent is extended or adjusted under 35 U.S.C. 154(b) by 0 days.

(21) Appl. No.: 18/298,165

(22) Filed: Apr. 10, 2023

(51) Int. Cl.

| | |
|---|---|
| ***F21V 7/00*** | (2006.01) |
| ***F21V 7/22*** | (2018.01) |
| ***F21Y 105/18*** | (2016.01) |
| *F21Y 115/10* | (2016.01) |

(52) U.S. Cl.
CPC .............. *F21V 7/0008* (2013.01); *F21V 7/22* (2013.01); *F21Y 2105/18* (2016.08); *F21Y 2115/10* (2016.08)

(58) Field of Classification Search
CPC ................................. F21V 7/0008; F21V 7/22
See application file for complete search history.

(56) References Cited

U.S. PATENT DOCUMENTS 5,709,460 A * 1/1998 Lester ........................ F21S 4/20 362/225
2014/0036506 A1* 2/2014 Wheelock ............... F21V 29/58 362/249.02

* cited by examiner

*Primary Examiner* — Karabi Guharay
(74) *Attorney, Agent, or Firm* — Clement Cheng

(57) ABSTRACT

The present disclosure relates to an indirect lighting fixture and includes a light source assembly, a reflector structure component, a bottom structure component and an appearance structure component. The direct light from the light source assembly irradiates symmetrically on the inner surface of the reflector structure component and is reflected and diffusely reflected, and then emitted from the light outlet of the bottom structure component. The direct light of the light source assembly is designed to be invisible. This innovation transforms the hotspot direct light of the light source assembly into more soft light of the surface light source, and the high-efficiency reflector structure component allows indirect lighting fixtures to achieve high light efficiency simultaneously.

18 Claims, 6 Drawing Sheets

INDIRECT LIGHTING FIXTURES WITH SYMMETRICAL LIGHT SOURCE

The present invention claims priority as a continuation in part of pending U.S. utility patent application Ser. No. 18/170,850 entitled Indirect Lighting Fixture With A Single Side Light Source by Xiong Chen, having a filing date of Feb. 17, 2023, the disclosure of which is incorporated herein by reference.

TECHNICAL FIELD

The present disclosure relates to an indirect lighting fixture.

BACKGROUND

Current light emission types of lighting fixtures are basically direct light emission, and some use a side light emission mode. Of course, there are very few indirect lighting fixtures on the market that use bottom emission and reflective coatings to reflect light. The light source of the direct light-emitting lighting fixture is concentrated on the upper part of the fixture, and the light source is densely concentrated in a point area or a strip area. The light source area is relatively small and of high brightness, which increases glare to the human eye. When the human eye looks directly at it, the human eye is easily irritated. In addition, most of the direct light-emitting lighting fixtures will install a diffuser plate, grille or fog cover at the light outlet to reduce the glare value, but these installations will block and lose part of the light emission.

The principle of side-emitting lighting fixtures is to place the light source on the side, pass the light through the light guide plate and the reflector plate, guide and reflect the light, and then emit the light through the diffuser plate. The side emitting light fixtures typically require a multi-layer structure design, the loss of light efficiency is large, and the durability of the light guide plate is also common.

Existing indirect lighting fixtures carry out reflective design via spraying a reflective coating on the inner surface of the exterior components. Light reflection efficiency of the current reflective coatings is low, and optical structures are not optimized, resulting in low light efficiency of the overall lamp. Indirect lighting fixtures are not common in the market as most fixtures use a lens or diffuser.

Therefore, the market has had a long felt need to develop a class of lighting fixtures that can achieve high light extraction efficiency, have no strong light spots and no direct light, are friendly to human eyes, and can reduce glare.

DISCUSSION OF RELATED ART

A variety of different indirect lighting configurations have been used in the industry, such as described in United States patents. For example, in Holten U.S. Pat. No. 8,579,473, issued Nov. 12, 2013 entitled Luminaire for Indirect Illumination, the inventor describes, "The luminaire further comprises a specularly reflective part (43) as part of the reflective screen, which specularly reflective part is concavely shaped for reflecting at least part of the light emitted by the light source towards a diffusely reflective part (42) of the reflective screen."

Also, for example, in Lavin, U.S. Pat. No. 10,208,905, issued Feb. 19, 2019 entitled Recessed Lighting Fixtures for Efficiently Providing Aesthetically Pleasing Indirect Lighting and U.S. Pat. No. 10,760,749, issued Sep. 1, 2020, entitled Recessed Lighting Fixtures for Efficiently Providing Aesthetically Pleasing Indirect Lighting, the inventor describes that, "A recessed light fixture configured to deliver indirect light to an area. The recessed light fixture includes a trim component, a reflector coupled to the trim component, and an annular ring including a plurality of light-emitting diodes (LEDs). The trim component has an outer wall and an inner wall spaced radially inward of the outer wall, and defines an annular recess between the outer and inner walls. The reflector includes a patterned reflective surface. The annular ring is arranged within the annular recess of the trim component. The LEDs are configured to emit light toward the reflector so that the reflector redirects the light to deliver the indirect light to the area."

Another example shown in U.S. Pat. No. 10,801,695, issued Oct. 13, 2020 entitled Lamp, the inventor describes, "The reflection hood (110) is made of diffuse reflection material, is a curved face formed by the translation of an elliptic arc, and has a light emitting outlet (114), and an inner surface thereof is a reflection face (112). The light source assembly (120) is fixed to an end of the reflection face (112) and the included angle between a tangent line, at the point of intersection of a central light emitted therefrom and the reflection face (112), and the central light is 130° to 170°."

In U.S. Pat. No. 7,922,354, issued Apr. 12, 2011 entitled Solid-State Lighting Fixtures, the inventor describes, "A high performance, high efficiency solid state electronic lighting device, having a sealed fixture body for use outdoors or in environments requiring IP rated sealed fixtures, uses light emitting diodes for producing light from AC current that operates on an as needed basis dependent upon occupancy, ambient light levels and facility load requirements."

Another significant example showed in U.S. Pat. No. 8,905,575, issued Dec. 4, 2014, entitled Troffer-Style Lighting Fixture with Specular Reflector, the inventor describes "An elongated heat sink with a mount surface for light sources runs longitudinally along the fixture. To facilitate heat dissipation, a portion of the heat sink is exposed to the ambient room environment. An elongated specular reflector also runs along the device proximate to the heat sink. The heat sink and the specular reflector are mounted such that a spatial relationship is maintained. Some of the light from the sources impinges directly on the specular reflector and is redirected towards a back surface. The back surface defines a luminous surface that receives light directly from the sources and redirected light from the specular reflector."

As documented in U.S. Pat. No. 9,699,856, issued Jul. 4, 2017, entitled Upgradeable Lighting Fixture, the inventor describes "The lens is supported by and attached to the outer frame. The solid-state light source is mounted to the outer frame and at least partially surrounded by the lens, such that at least a portion of the light provided by the solid-state light source is transmitted through the lens towards an area of interest.

As seen in US Patent 2012/0051041, issued Mar. 1, 2012, entitled Troffer-Style Fixture, the inventor describes "The troffer comprises a light engine unit that is surrounded on its perimeter by a reflective pan. A back reflector defines a reflective interior surface of the light engine."

Another example shown in U.S. Pat. No. 10,208,933, issued Feb. 19, 2019, entitled Adjustable Light Fixture and Lighting System, the inventor describes "A housing is selectively adjustable to a selected housing length and is mountable to the surface. A tray mountable to the housing includes plates which are selectively adjustable relative to one another to a selected tray length. Each plate includes a plurality of electroluminescent light sources providing uniformly luminous light across the light fixture. Overlap of plates varies the tray length and blocks light from light sources on one plate by the opposite plate."

One final example shown in U.S. Pat. No. 10,584,860, issued Mar. 10, 2020, entitled Linear Light Fixture with Interchangeable Light Engine Unit, the inventor describes "The lighting subassembly comprises the light sources and optical elements that tailor the light to achieve a particular profile. Electronics necessary to power and control the light sources may be disposed in the housing subassembly, the lighting subassembly, or both."

The foregoing references are incorporated herein by reference and relate to indirect lighting solutions that attempt to produce a uniform light. However, some of the structures can still be improved.

SUMMARY OF THE INVENTION

The present invention provides an indirect light that is both comfortable and friendly to human eyes while featuring symmetrical light sources with different appearance characteristics without strong light spots and direct light. The present invention can operate according to different types of light sources of existing lamps such as LED and incandescent lighting.

Based on these requirements, our design idea is to distribute the light source symmetrically in our indirect lighting fixture. The symmetrically distributed light is radiated from the light source point to a larger area of high-efficiency reflective material surface. Then the light is reflected and diffusely reflected to emit out through the light outlet. In this way, the light is changed from a point light source to a surface light source, and the surface light source directly reduces the maximum light intensity per unit area. The symmetrically designed light source makes light distribution, reflection, and diffuse reflection more uniform. This process of reflection and diffuse reflection changes light from the concentrated point light at the light source point to an indirect light after reflection and diffuse reflection. At the same time, a sidewall structure is adopted in the design, which can completely prevent direct light from escaping from the light outlet of the lighting fixture. The sidewall structure also optimizes the loss of light by providing a reflection process through the structure, and realizing the indirect lighting of the whole lamp to achieve the desired effect of a high light efficacy and a low glare value.

This innovation is an indirect lighting fixture to achieve the above effects, which mainly includes the following four components:

1. A light source assembly is responsible for providing the light source and is a whole light-emitting circuit. The light source assembly can be designed or installed with a certain angle of inclination to correspond to reflective structures with different depths and inner radians. At the same time, the light source assembly can also be covered with optical lens components to adjust its own light output angle and light output amplitude to achieve optimal light efficiency. In this innovation, the light points of the light source assembly will be symmetrically distributed and designed in the lighting fixture. This symmetry is two-way symmetry, such as left and right or up and down. The light source assembly can also be omnidirectional symmetry, that is, up, down, left, and right are symmetrical to each other.

2. A reflector structure component is a semi-enclosed reflective structure made of reflective plastic material. Its inner surface has light reflective and diffuse reflective properties. One side of the reflector structure component is the light outlet, and the other side is designed to have a certain depth according to different types of lighting fixtures. The reflector structure component may be a different style of dome or arch, and different heights or slopes can also be spliced under the dome or arch. The straight or beveled sides add depth.

3. A bottom structure component. The bottom structure component constitutes the installation structure and appearance of the bottom. The bottom structure component is responsible for installing and fixing the light source assembly at a certain angle, or installing and fixing the light source assembly together with the appearance components. It is designed with corresponding shading structures according to the principle that the direct light of the light source assembly cannot be directly emitted through the exit light, achieving a fully indirect lighting effect.

4. An appearance structure component protects and installs the reflector structure component. The appearance structure component is part of the overall structure of the appearance of this embodiment of the indirect lighting fixture and can be a housing.

The light source points of the light source assembly are designed to be symmetrically distributed on the bottom of the reflective structure. The angle between the installation angle line of the light source assembly and the horizontal line of the two outermost symmetrical points of the light outlet of the reflective structure component should be within the range of greater than and less than or about equal to 180° (90°<angle≤180°). Under the same section, the center line of the light source point should be below the line connecting the center point of the light source (LED apex) and the reflective structure component apex. The angle formed by these two lines should be within the angle range between zero and 45° (0°≤angle<45°). The lowest luminous line of the highest luminous point of each LED chip does not cross the rib of the bottom structural component and thus original light from the light source cannot be emitted from the light outlet of the lighting fixture.

The present invention has a variety of different advantages.

The present invention increases the light-emitting area, avoids the high-intensity light of the point light source, and makes the light softer. Increasing the effect of surface light sources, the present invention ultimately reduces glare and protects our eyes.

The present invention improves lighting effects. The present invention saves the cover of traditional lamps. The traditional cover is usually transparent plastic or glass which loses more than 10%-20% luminosity according to different materials.

The indirect lighting fixtures designed and modified by this structure can fully meet the energy standards of Energy Star (ES) for lighting fixtures, and in some cases the present invention can even reach a light efficiency of more than 110 LM/W (lumens per watt) under better reflective materials and structural design conditions.

Reduce the shadow of the light after being blocked and increase the light angle. Because of the secondary reflection and the surface light source, the light source point is larger, the light is more divergent, and the light output angle is increased. More and larger areas of light, compared with traditional point light sources, the present invention can reduce the shadow of the dark area formed after the light is blocked by the small object in the illumination range to a certain extent, and increase the brightness of the shadow area in the dark area, and the present invention will also increase the light angle, to get a larger light angle.

The present invention produces a different appearance for lighting fixtures. The present invention changes the shape and structure of the lamps to a certain extent, realizes the diversification of the lighting appearance structure of the lamps, can design lamps with different aesthetic effects, and brings new choices for decoration.

To explain the relevant details and corresponding relationships more clearly, the following drawing will be used to show this disclosed innovative technical solution, which is not necessarily drawn entirely to scale, and may not represent the actual appearance of the product.

SUMMARY OF THE CLAIMS

The indirect lighting fixture with a symmetrical light source has a light source assembly. The light source assembly is configured to emit light and includes a light-emitting diode (LED) connected to an electrical circuit. The light source assembly has a certain angle of inclination to correspond to reflective structures with different depths and inner radians. Light points of the light source assembly are symmetrically distributed with a two-way symmetry, two-way symmetry a left and right symmetry or an up and down symmetry. A reflector structure component has a semi-enclosed reflective structure made of reflective material and having an inner surface with light reflective and diffuse reflective properties. On one side of the inner surface is the light outlet, and the other side of the inner surface has a certain depth according to different types of lighting fixtures such that the reflector structure may be formed as a dome or an arch, and wherein differing heights or slopes are spliced under the dome or arch. Straight or beveled sides add depth. A bottom structure component constitutes the installation structure and appearance of a bottom. The bottom structure component is configured for installing and fixing the light source assembly at a certain angle is designed with corresponding shading structures according to the principle that direct light from the light source assembly does not directly emit from the light source assembly, achieving a fully indirect lighting effect. An appearance structure component protects and installs the reflector structure component. The apparent structure of employment is a part of the indirect lighting fixture with symmetrical light source.

Optionally, the light source assembly is covered with optical lens components to adjust its own light output angle and light output amplitude to achieve optimal light efficiency. An omnidirectional symmetry, where the up, down, left, and right orientations can be symmetrical to each other. The lowermost emitting light line of the uppermost light emitting point of the LED chip does not directly shine outside of the light outlet. The bottom structure component installs or fixes the light source assembly together with the appearance components, wherein the bottom structure component further includes an extending edge extension tip that blocks the light from the lowermost emitting light line of the uppermost light emitting point of the LED chip. A beta angle can be defined between a light source assembly installation angle line and a light outlet horizontal line, wherein the beta angle is between or equal to 90° and 180°. The beta angle is an inclination angle adjusted according to a radian and depth of an inner surface of the reflector structural component.

Two lines can be defined within a slope angle having a lambda angle between them which is between or equal to 0° to 45°. The center emitting line of the LED of the light source assembly is within an angle range to optimize light output effect. All light emitting centerlines of all the LED chips pass through the centerline of the cross-section of the reflective structure component to the other side of the centerline. The lambda angle formed is within the range of greater than or equal to 0° and less than 45°. The symmetry and uniform cross lighting of this design allows the light rays within the light emission angle α of the LED point light sources to achieve a maximum range of effective light emission and be reflected.

BRIEF DESCRIPTION OF THE DRAWINGS

FIG. 5*b* is a cross-section view of FIG. 5*a*.

THE FOLLOWING CALL OUT LIST OF ELEMENTS CAN BE A USEFUL GUIDE IN REFERENCING THE ELEMENT NUMBERS OF THE DRAWINGS

80 Alpha Angle
81 Light Source Assembly Channel
82 Beta Angle
83 Lambda Angle
100 Indirect Lighting Fixture
110 Light Source Assembly
111 LED Chips
112 Substrate
113 Optical Lenses
120 Reflector Structure Component
121 Reflector Structure Component Light Outlet
122 reflector structural component inner surface
130 Bottom Structure Component
131 Bottom Structure Component Light Outlet Aperture
132 Bottom Structure Component Edge
133 Edge Extension Tip
140 Appearance Structure Component
150 Uppermost Emitting Light Line of The Uppermost Light Emitting Point Of The LED Chip
151 Lowermost Emitting Light Line of The Lowermost Light Emitting Point Of The LED Chip

152 Central Luminous Line
153 Lowermost Emitting Light Line Of The Uppermost Light Emitting Point Of The LED chip
154 Reflector Central Vertical Line
155 Apex Connecting Line
156 Light Source Assembly Installation Angle Line
157 Horizontal Line Of The Light Outlet (Aperture)
158 Apex

DETAILED DESCRIPTION OF THE EMBODIMENTS

The following embodiment, which is an indirect lighting downlight produced by adopting the above innovative design, will be described in detail with reference to the schematic diagrams above.

Figure 1:
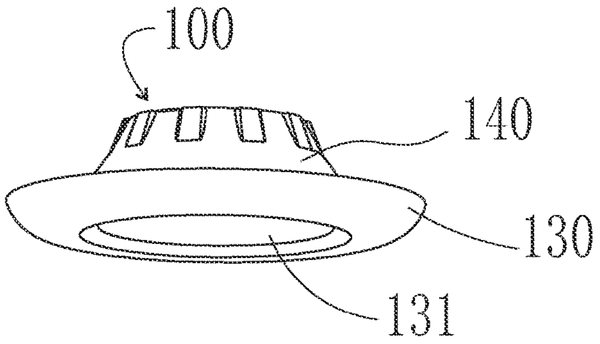
FIG. 1 is a schematic diagram of the overall appearance according to an embodiment of an indirect lighting fixture.

As shown in FIG. 1, an indirect lighting fixture 100 when seen externally has a bottom structure component 130 and bottom structure component light outlet aperture 131 formed on the bottom structure component 130. The appearance structure component 140 is formed as an upper housing and preferably has ornamental features to allow consumers to distinguish between different products.

Figure 2:
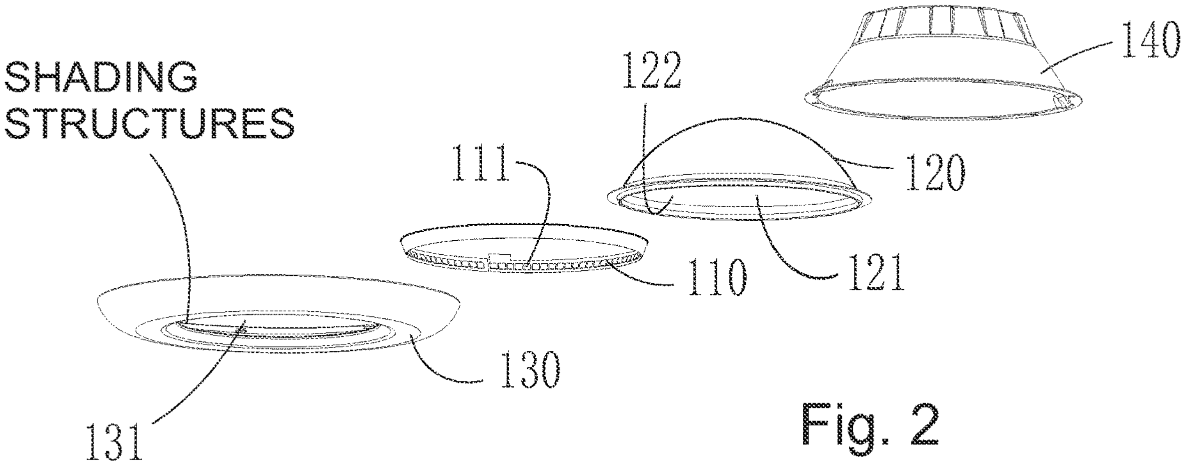
FIG. 2 is an exploded view of the structure of the indirect lighting fixture shown in FIG. 1.

As shown in FIG. 2, an exploded view of the present invention shows the appearance structure component 140 fitting over the reflector structure component 120. The reflector structure component 120 has a reflector structure component light outlet 121. The reflector structure component light outlet 121 fits with and matches the bottom structure component light outlet aperture 131. The light source assembly 110 has a ring of LED chips 111. A light source assembly 110 fits over the bottom structure component 130 and can be snap fit together during assembly. A reflector structure component 120 fits over the bottom structure component 130. The appearance structure component 140 fits over the reflector structure component 120.

The reflector structure component 120 is a semi-closed structural member formed by processing or bending reflective materials. One side of the reflector structure component 120 is a fully opening light outlet 121, and the light outlet 121 of the reflector structure component 120 is designed according to the structure of different embodiments, so the shape of its opening will vary according to the design of the lamp body structure. At the same time, the light outlet 121 of the reflector structure component 120 is larger than the light outlet 131 of the bottom structure component 130, and the opening directions of the two are the same. The other side of the reflector structure component 120 is a closed structure with a certain inner radian surface 122. Depending on the embodiment of the specific luminaire, the embodiment may have different styles of top arched or domed shapes.

Referring to FIG. 2, the bottom structure component 130 is a structural member for installing and combining the light source assembly 110 and the reflector structure component 120. According to certain design requirements, the bottom structure component 130 fixedly combines the light source assembly 110 and the reflective structure component 120 at a certain installation angle to achieve the best overall light output effect. The appearance structure component 140 is a lamp shell whose shape is close to that of the reflector structure component 120. After being assembled and installed with other components, the appearance structure component 140 forms an integral part of the appearance of the indirect lighting fixture 100. The appearance structure component 140 also protects and secures the reflector structure component. The appearance structural component 140 may have various shapes according to the exterior design requirements of the lamp. The appearance structural component 140 can also be superimposed with other structures on the current basis to place power supplies or other appearance modules with different functions. The appearance structural component 140 can be plastic or metal. According to different lighting application scenarios and different design requirements, the appearance structure component 140 has many possibilities.

Figure 3:
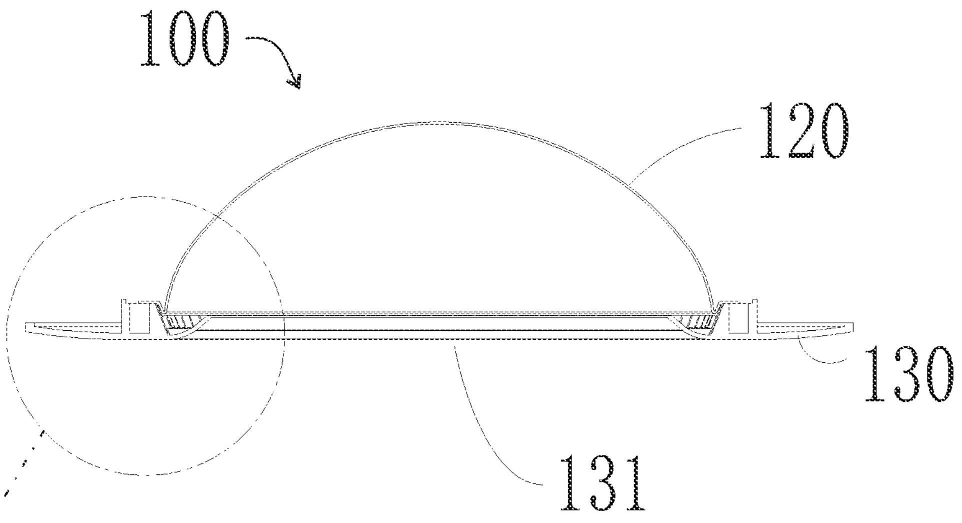
FIG. 3 is a simplified selection diagram of the indirect lighting fixture shown in FIG. 1.

As shown in FIG. 3, a general cross-section of the indirect lighting fixture 100 shows a reflector structure component 120 mounted to the bottom structure component 130. The bottom structure component 130 can be shown as a trim having a flashing around its bottom structure component light outlet aperture 131.

Figure 4:
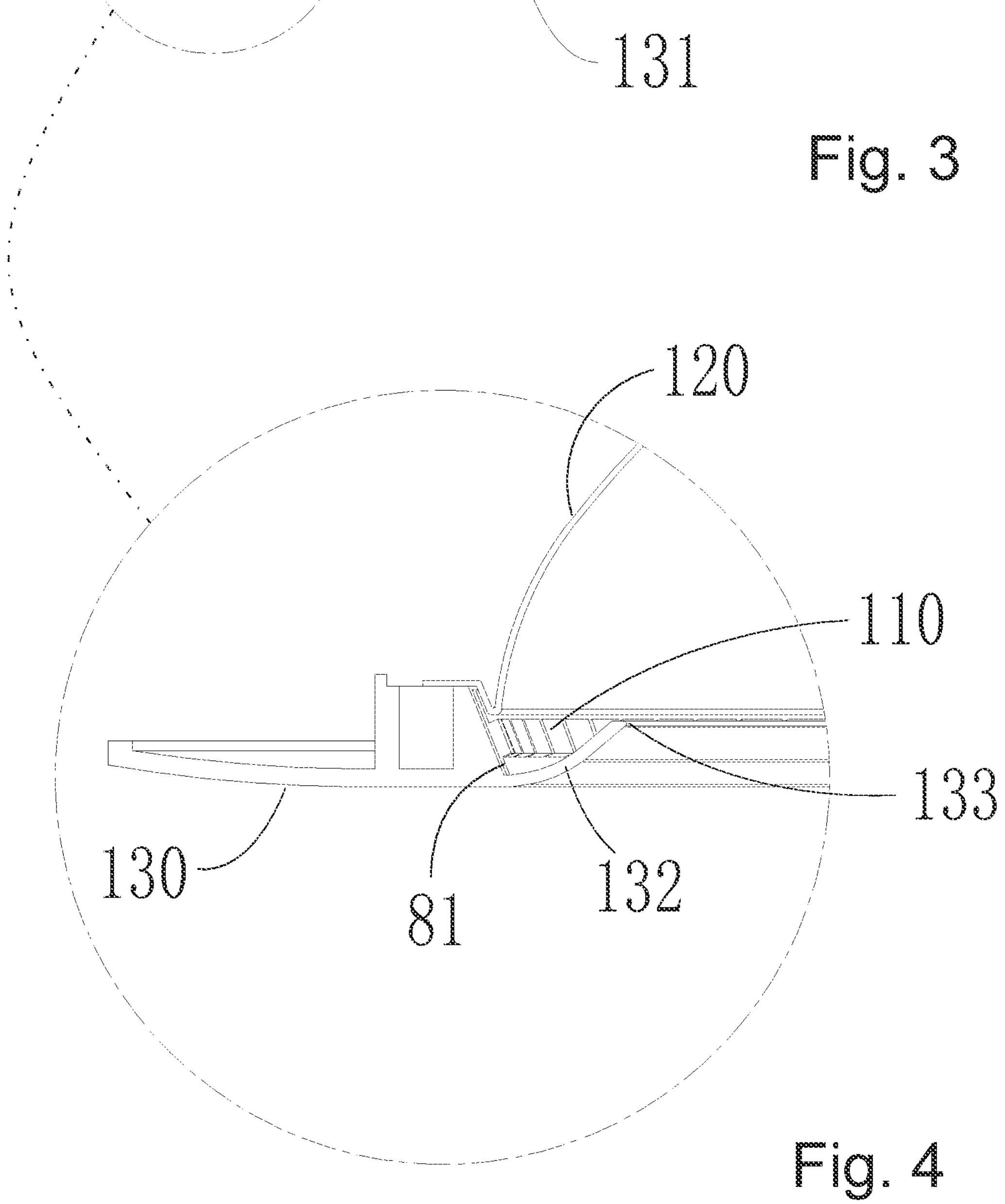
FIG. 4 is a partially enlarged view of the simplified selection diagram of the indirect lighting fixture shown in FIG. 3.

As shown in FIG. 4, a close-up view of a portion of the section in FIG. 3 shows the reflector structure component 120 mounted over the bottom structure component 130. The bottom structure component 130 has an extending edge extension tip 133 that extends from the bottom structure component edge 132. The light source assembly 110 is mounted in a light source assembly channel 81 formed between the bottom structure component edge 132.

Figure 5A:
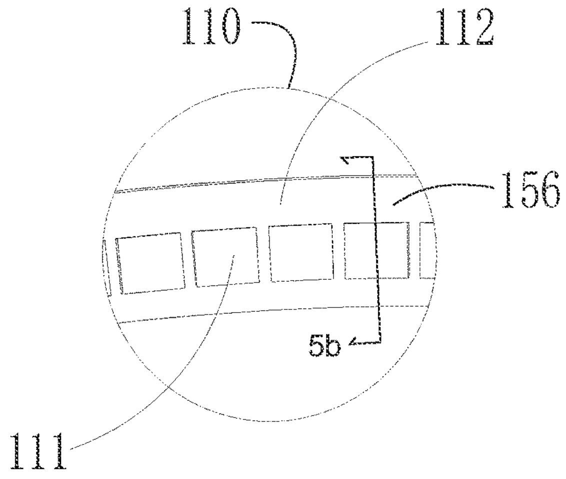
FIG. 5*a*, and FIG. 5*b* are a schematic diagram of the LED light source of the indirect lighting fixture shown in FIG. 1.

As shown in FIG. 5*a*, the light source assembly 110 is a luminescent light source composed of a group of LED chips 111 pasted on the substrate 112 in a light source assembly channel 81. This embodiment uses conventional LED light sources as an example, but this innovation is not limited to only use of LED light sources, and can also use other types of light sources, such as CCFL, laser lights, tungsten lamps, etc. LED 111 is a semiconductor light-emitting diode. LED 111 is a cold light source. LED 111 has a high photoelectric conversion rate and small size, and the light angle of LED 111 for general lighting is 120 degrees.

The LED chips are surface mounted on a substrate 112. The substrate 112 may be a flexible board, or the substrate 112 may be a hard metal substrate. Usually, the substrate 12 is lined with copper wires inside and is a PCB board containing electronic circuits. Welding points on the surface of the substrate 112 connect the LED CHIP 111 to form the light source assembly 110.

Figure 5B:
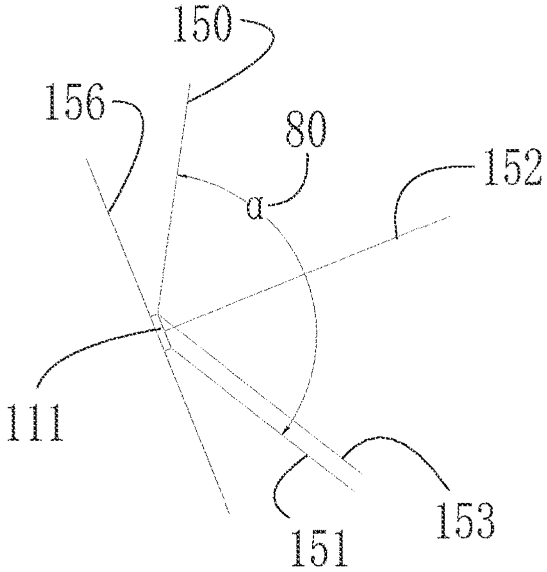

Referring to FIG. 5*b*, the LED 111 of the light source assembly 110 has its light emitting range denoted by alpha angle 80. Alpha angle 80 is defined between an uppermost emitting light line of the uppermost light emitting point of the led chip 150 and lowermost emitting light line of the lowermost light emitting point of the led chip 151.

The uppermost emitting light line of the uppermost light emitting point of the led chip 150 is the uppermost emitting light line of the uppermost light emitting point of the LED 111 chip. The lowermost emitting light line of the lowermost light emitting point of the led chip 151 is the lowermost emitting light line of the lowermost light emitting point of the LED chip. The maximum included angle $\alpha$, called the alpha angle 80, is defined between the uppermost emitting light line of the uppermost light emitting point of the led chip 150 and the lowermost emitting light line of the lowermost light emitting point of the led chip 151 as 120°.

The central luminous line 152 is at a 90° angle to the horizontal plane of the LED chip 111, which is the light source assembly line 156 and is also the most central outward emitting straight line of the LED chip 111 light emitting area. The central luminous line 152 is the central line of emission from the LED chip apex. The light source assembly installation angle line 156 is normal to the central luminous line 152. The light source assembly installation angle line 156 is on the plane where the LED is mounted to its substrate such as a printed circuit board.

According to the different design of the overall structure of different lighting fixtures, the shape of the light source assembly 110 is also different. The light source assembly 110 can be a closed loop connected end to end, according to FIG. 2, or the light source assembly 110 can be formed of parallel multiple strips formed by two or more substrates pasted with LED chips. The light source assembly 110 shape is designed according to the shape of the light outlet 131 and the bottom shape of the reflector structure component 120 and the light effect requirements. The light source assembly 110 light source points have a certain symmetrical arrangement in this innovation.

Figure 6:
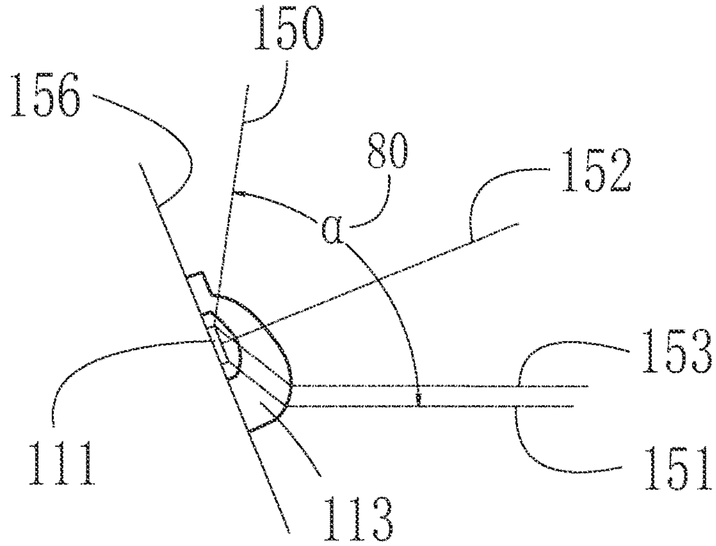
FIG. 6 is a schematic diagram of the indirect lighting fixture shown in FIG. 5 after the LED light source covers the optical lens.

Referring to FIG. 6, a set of optical lenses 113 can be additionally mounted to the surface of the light emitting source assembly 110 according to the light emission direction and light emission amplitude as required. The optical lens 113 covers the surface of the LED 111 light source. The optical lens 113 can change the light emitting direction of the LED 111 according to the pre-designed parameters, realize the light concentrating and astigmatism, and also change the size range of the light emitting angle α of the light emitting light, helping to realize the best effects of indirect light.

Referring by comparison between FIGS. 4,5, 6, by adding the optical lens 113, highlighted in FIG. 6, the angle of the light emitted by the light source assembly 110 has been changed. Using the optical lens 113 to condense the light and change the range of the light angle of the light can avoid the situation that the light angle caused by the light angle of the light is too large or unsuitable to be incident on other non-reflective surfaces such as the rib 132 of a bottom structure component 130. The optical lens 113 can controllably gather light and irradiate light to the inner reflective surface of the reflective structural part 120 to achieve the best light effect. Similarly, to achieve the effect of indirect lighting, the light from the light source assembly 110 covered with the optical lens 113 cannot exit from the light outlet 131 of the bottom structure component 130. Generally, if the optical lens 113 is used to change the light output direction, the overall light output efficiency will be lost by 10%-15% or even more due to the different materials of the lens 113.

Figure 7:
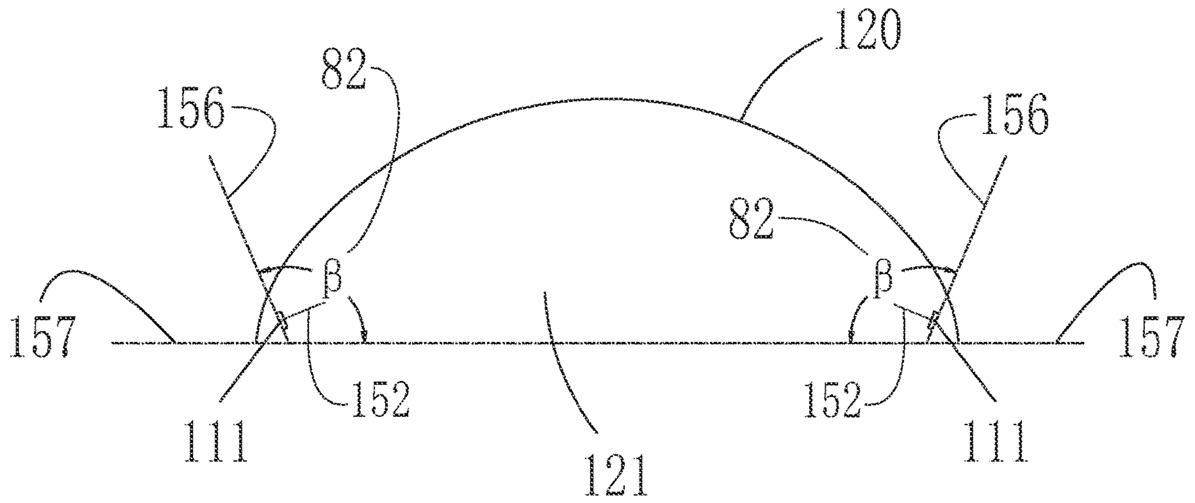
FIG. 7 is a simplified illustration of component placement angles for this indirect lighting fixture shown in FIG. 1.

Referring to FIG. 7 to maximize the light extraction efficiency, in the case of different reflector structure components 120, the light source assembly installation angle line 156 of the light source assembly 110 without lens covering and the light outlet horizontal line 157 of the reflector structure component 120 form a beta angle 82. Beta angle 82 is defined between the light source assembly installation angle line and the horizontal line of the light outlet. Beta angle 82 is an inclination angle β formed at between or equal to 90° and 180° (90°<β≤180°). According to the radian and depth dimensions of the inner surface of the reflector structural component 120, adjusting the magnitude of the included angle can allow more and better light from the light source assembly 110 to radiate the inner reflective surface of the reflector structure component 120.

Referring to FIG. 6 and FIG. 7, in the case where the optical lens 113 covers the light source assembly 110, the maximum light output angle α and the light output line 150 and 151 of the light source assembly 110 can be changed. According to the requirements of light effect, different angles and light output directions can be designed, so the placement position and placement angle β of the light source assembly 110 will be relatively flexible. The light source assembly 110 covered with the optical lens 113 can be kept parallel to the horizontal line of the light outlet 131 of the bottom structure component 130, that is, the angle β=180° is used to place the light source assembly 110 or other large slope angles. This design is usually conducive to structural installation, or to facilitate production and assembly. Although in the case of adding the optical lens 113, the tilt angle β has more flexibility, but in the end, no matter whether the optical lens 113 is added or not, the installation position of the light source assembly 110 will still fall within the range of the angle β. Greater than 90 degrees and less than or equal to 180 degrees.

Figure 8:
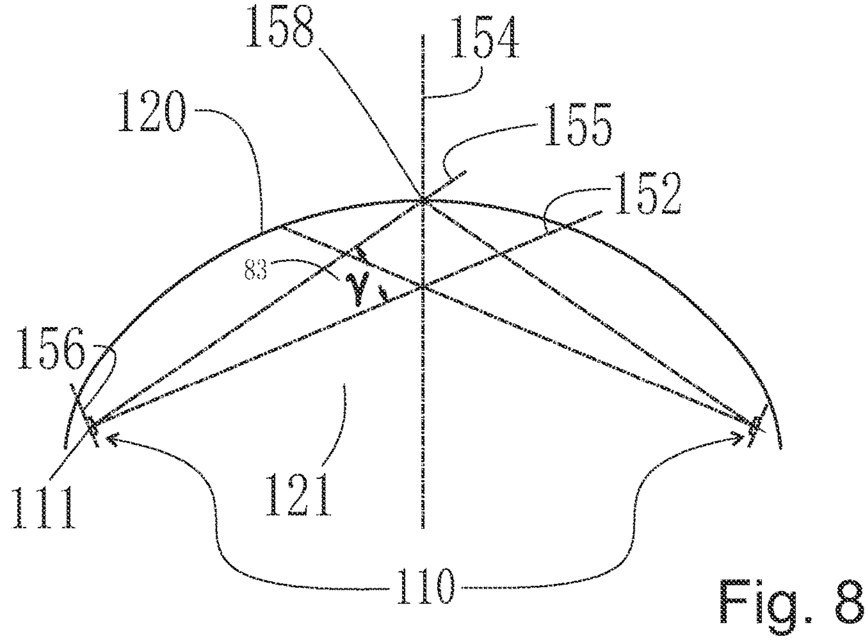
FIG. 8 is a simplified diagram of the outgoing line of this indirect lighting fixture shown in FIG. 1.

Referring to FIG. 8, the reflector structure component 120 has an apex 158 which is the highest central point of the structure, and the reflector central vertical line 154 of its cross section defines the central half vertical tangent. In an indirect lighting fixture designed according to a symmetrical light source, under a cross section view the reflector structure component 120 has the apex 158 of this internal arc reflection structure. The light source points at opposite sides are relatively symmetrical and produce symmetrical light output.

Depending on the requirements of different lamp embodiments, the reflective structure 120 may be increased with straight or inclined edges of different heights at the bottom, and the dome shape or semicircular upper structure of the inner arc surface can be extended above the straight or inclined surfaces. Such a design can provide the reflective structure with a deeper height and more internal reflective surfaces, which can bring different lighting efficiency and appearance characteristics and reduce the light emission angle.

The central luminous line 152 of the LED chips 111 of the light source assembly 110 can be covered by a lens or without a lens. An apex connecting line 155 forms a connecting line from the LED chip to the reflector structure component apex. The apex connecting line 155 can be defined as beginning at the center point of the LED chips 111 and extending to the apex 158 which is located at the center apex section of the reflective structure component 120 when taking a cross-section of the reflective structure component 120. At the same time, the two lines namely the central luminous line 152 and apex connecting line 155 are within a slope angle γ, namely the lambda angle 83 ranging from 0° to 45° (0°≤γ≤45°). The central luminous line 152 of the LED 111 of the light source assembly 110 is within this angle range to form the best light output effect. That is, all light emitting centerlines namely the central luminous line 152 of all LED 111 chips pass through the reflector central vertical line 154 of the cross-section of the reflective structure component 120 to the other side of the reflector central vertical line 154, and the angle γ formed is within the range of greater than or equal to 0° and less than 45°, thereby realizing symmetry and uniform cross lighting. This design allows the light rays within the light emission angle α of the LED chips 111 assembled as a point light source to achieve the maximum range of effective light emission upon reflection.

When the shape of the inner surface of the reflector structure component 120 is different than shown, such as having different straight edges or oblique edges, or different internal dome designs, the reflection on the inner surface of different structures will cause multiple different reflections and diffuse reflections of light, and the range of the oblique angle may vary, requiring adjustment of the angle γ value to obtain the best light efficiency. The general way to find the best light output angle γ value is to use the process of elimination. For example, first choose the middle value of the best range of angle γ, which is greater than or equal to 0 degrees and less than 45 degrees, i.e., 22.5 degrees, and then take another middle value of 11.25 degrees and 33.75 degrees on each side and perform three-point actual measurements of light efficiency values. Among the three-point actual measurement values, 22.5 degrees is normally the middle value, then filter out the side with low light efficiency values. Next step is to choose the middle value of the angle on both sides of the selected high light efficiency value area for the second screening. Generally, after 2-3 screenings, the best light efficiency angle γ value can be found. The angle β value will be changed with the change of the angle γ value, with the angle γ value given priority.

The reflector structure component 120 is mainly made of a type of plastic material with high-efficiency light reflection and diffuse reflection properties. This reflective material may be PET material, PC material, foamed polycarbonate, or expanded polystyrene foam or other types of plastic materials. Currently they are mainly used in the display industry as well as traditional direct lighting fixtures. For example, MCPET/MCPOLYCA material series of FURUKAWA can achieve a high light efficiency of 99% in light reflection efficiency and 96% in light diffuse reflection efficiency. Such high luminous efficacy helps to solve the loss problem of the innovative light in reflection, enabling indirect lighting fixtures to be realized.

Reflective plastic materials can generally be thermoformed or die-cut into different appearance shapes. In the structural design of lamps, the processed reflective material is our reflective structure component 120. The reflective material has a certain degree of stretchability, and the reflective material is flexible such that it can be bent and curled. At present, there are many types of reflective plastic materials from many companies on the market that can achieve high light efficiency and diffuse reflection light output. Their products can be replaced by each other. At present, they are widely used in different types of traditional direct lighting fixtures.

As shown in FIG. 8, in this cross-section, the LED 111 beads on the lower left side of the bottom structure component 130 illuminate towards the upper right direction of the inner surface of the reflective structural component 120, while the LED 111 beads on the lower right side of the bottom structural component 130 illuminate towards the upper left direction of the inner surface of the reflective structural component 120. The LED 111 beads on both sides of the bottom structure component 130 in any cross-section illuminate at the same time and irradiate the inner surface of the reflective structure component 120 in the opposite direction.

As shown in FIG. 8, this two-way symmetric cross-emitting lighting design will allow the light to illuminate as a whole and diffusely reflect to the inner reflective surface of the entire reflector structure component 120. The high efficiency material will help the light to be multi-reflected on the surface of the reflective structure component 120. The light on the internal reflective surface of the reflective structure component 120 will be evenly distributed without bright spots, which can avoid the situation that some areas of the internal reflective surface of the reflector structure component 120 are bright and some areas are dark.

The comprehensive omnidirectional symmetrical cross lighting design can effectively avoid or reduce the phenomenon of yellow light edge or colored light edge on the outermost edge of the light outlet (aperture)131 of the bottom structure component 130. If the light on the outermost side of the light outlet (aperture) 131 of the bottom structure component 130 has yellow light edges or colorful light edges, when designing the structure, then an added layer of diffusion cover on the LED 111 chips can solve the yellow edge of the outermost light or colorful edge phenomenon. Under the condition of symmetrical light reflection with light sources on different sides, the color fringing or yellow fringing is relatively slight or non-existent. If the light source assembly 110 is only parallel and symmetrical, for example, under the condition of double parallel light sources parallel up and down or parallel to left and right, and only the light sources on both sides are symmetrically lit, this issue is easy to appear.

Figure 9:
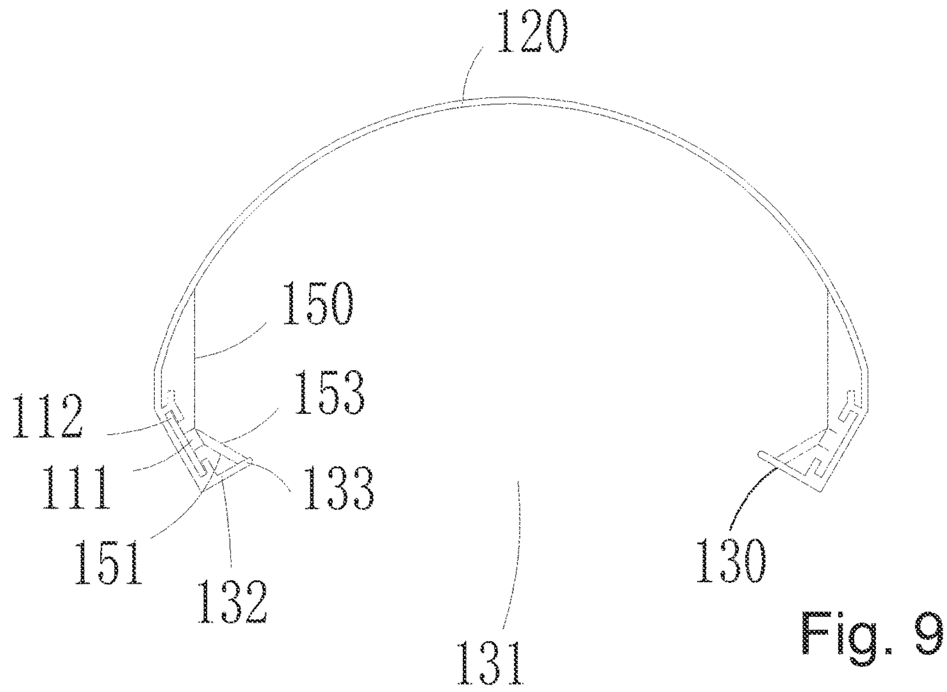
FIG. 9 is an enlarged schematic diagram of the edge design of the indirect lighting fixture shown in FIG. 1.

Referring to FIG. 9, the bottom structure component 130 needs to be designed such that the direct light emitted by the light source assembly 110 cannot be seen through the light outlet (aperture) 131 of the bottom structure component 130 under any viewing angle. The lowest light emitting line 153 of the light-emitting point on the uppermost side of the LED 111 needs to be irradiated to the edge extension tip 133 of the edge 132 of the bottom structure component 130 or lower than it. The direct light will not be seen. Similarly, any direct outgoing light after the cover lens 113 is added above the light source assembly 110 to change the light angle of the outgoing light cannot pass through the light outlet 131 of the bottom structure component 130 and directly exit.

To achieve the uniformity and saturation of the light emitted in this innovative embodiment, when designing the corresponding relationship between the light source assembly 110 and the reflective structural component 120, the light emitted by the LED chips 111 light source point of the light source assembly 110 must illuminate symmetrically. The LEDs 111 of the light source assembly 110 need to be symmetrically distributed on the bottom of the reflective structural component 120. This symmetry is a relative symmetry. The light source assembly 110 can be symmetrical on the left and right sides, that is, the two sides of the light outlet 131 are symmetrical with two parallel LED chips 111, and the two LED chips 111 emit light upward, which will cross each other according to the set angle parameters. This symmetry can also be circular or oval or square or rectangular closed-loop light source points connected end to end. These light source points LED chips 111 will be on opposite sides of the light outlet 131. The light source points are symmetrical with each other.

Figure 10:
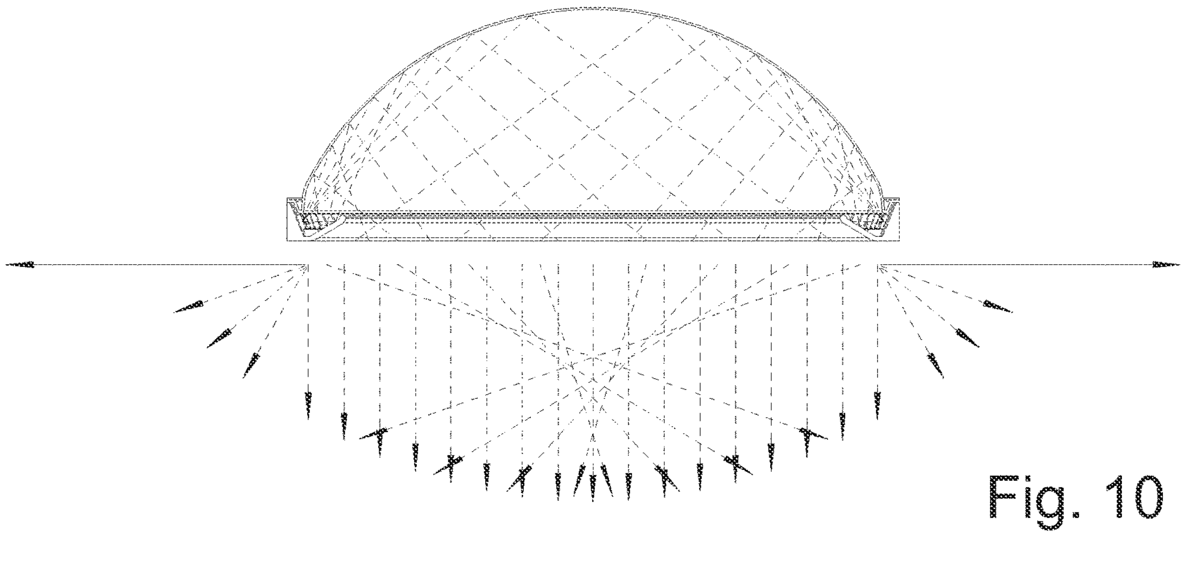
FIG. 10 is a schematic diagram of the light output after reflection/diffuse reflection of the indirect lighting fixture shown in FIG. 1.

Referring to FIG. 10, the light source points of the symmetrical light source need to be uniform and evenly distributed with a certain interval. The distances between the light source points of the light source assembly are approximately the same, and the light source points are evenly distributed. According to different luminous flux requirements, the greater the luminous flux requirement, the greater the relative density of each light source point, and the lower the luminous flux, the wider the distance between each light source point.

Figure 11:
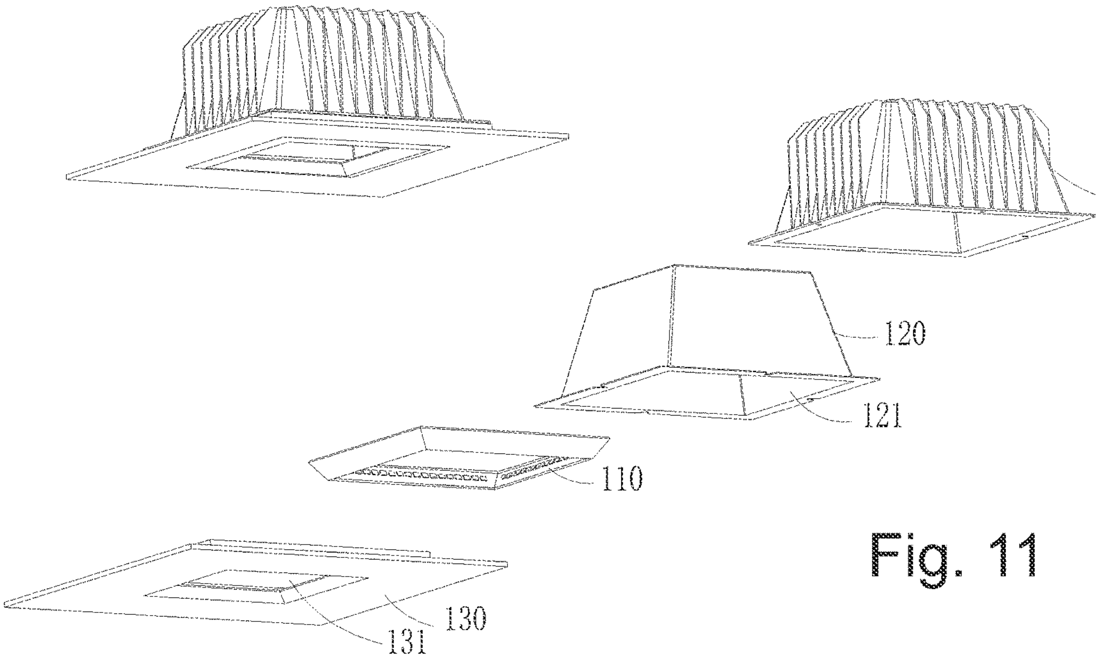
FIG. 11 is an embodiment of a lighting fixture with square style symmetrical light source.

As seen in FIG. 11, the present invention can be formed as a square style symmetrical light. A lighting fixture with a square style symmetrical light source will have a square or rectangular light source component 110 composed of LED chips distributed symmetrically in all directions. The bottom structure component light outlet aperture 131 is also square. The reflector structure component light outlet 121 is also square. The bottom structure 130 is responsible for installing the light source component and blocking direct light. The reflective structure component 120 can be made of high light tolerance with high reflection efficiency plastic material. The lighting fixture also has an appearance structure component 140 which can also be formed as an upper housing.

Figure 12:
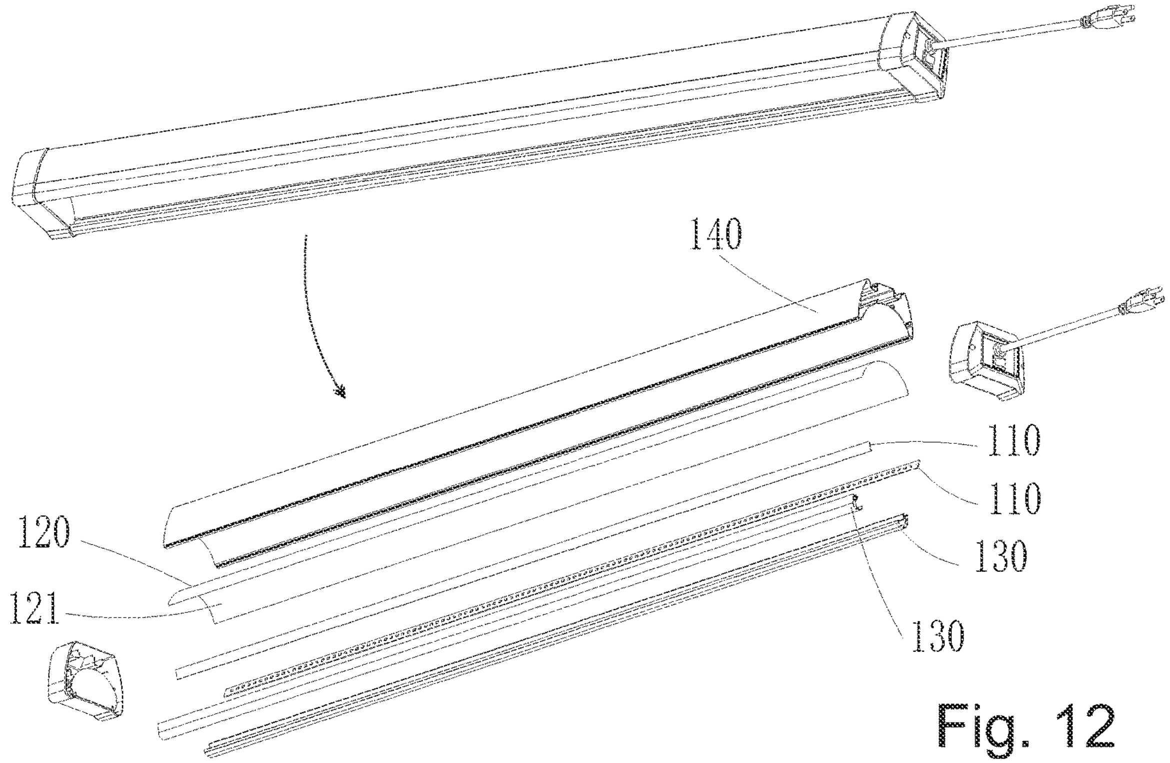
FIG. 12 is an embodiment of a lighting fixture with parallel symmetrical light source.

Referring to FIG. 12, a lighting fixture has a parallel symmetrical light source. The light source component 110 is composed of double symmetrical parallel and evenly distributed LED chips. The LED strips are mounted on both sides. The bottom structure 130 parts are responsible for installing the light source component and blocking the direct light from the light source. The reflective structure component 120 having an elongated reflector structure component light outlet 121 is made by the high light reflection efficiency plastic material. The lighting fixture also has an appearance structure component 140.

The invention claimed is:

1. An indirect lighting fixture with a symmetrical light source comprising:

a. a light source assembly, wherein the light source assembly is configured to emit light and includes a light-emitting diode (LED) connected to an electrical circuit, wherein the light source assembly has a certain angle of inclination to correspond to reflective structures with different depths and inner radians, wherein light points of the light source assembly are symmetrically distributed with a two-way symmetry, the two-way symmetry a left and right symmetry or an up and down symmetry, b. a reflector structure component, wherein the reflector structure component has a semi-enclosed reflective structure made of reflective material and having an inner surface with light reflective and diffuse reflective properties, wherein on one side of the inner surface is the light outlet, and the other side of the inner surface has a certain depth according to different types of lighting fixtures such that the reflector structure may be formed as a dome or an arch, and wherein differing heights or slopes are spliced under the dome or arch, wherein straight or beveled sides add depth;

c. a bottom structure component, wherein the bottom structure component constitutes the installation structure and appearance of a bottom, wherein the bottom structure component is configured for installing and fixing the light source assembly at a certain angle is designed with corresponding shading structures according to the principle that direct light from the light source assembly does not directly emit from the light source assembly, achieving a fully indirect lighting effect; and d. an appearance structure component, wherein the appearance protects and installs the reflector structure component, wherein an apparent structure of employment is a part of the indirect lighting fixture with symmetrical light source, further comprising a beta angle defined between a light source assembly installation angle line and a light outlet horizontal line, wherein the beta angle is between or equal to 90° and 180°, wherein the beta angle is an inclination angle adjusted according to a radian and depth of an inner surface of the reflector structural component wherein an optical lens covers the light source assembly, wherein the maximum light output angle is defined as an alpha angle and a light output line of the light source assembly is adjustable according to the requirements of light effect, different angles and light output directions, wherein a placement position and placement beta angle of the light source assembly is flexible.

2. The indirect lighting fixture with symmetrical light source of claim 1 further including an omnidirectional symmetry, where the up, down, left, and right orientations are symmetrical to each other, wherein the lowermost emitting light line of the uppermost light emitting point of the LED chip does not directly shine outside of the light outlet.

3. The indirect lighting fixture with symmetrical light source of claim 2, wherein the bottom structure component installs or fixes the light source assembly together with the appearance components, wherein the bottom structure component further includes an extending edge extension tip that blocks the light from the lowermost emitting light line of the uppermost light emitting point of the LED chip.

4. The indirect lighting fixture with symmetrical light source of claim 1, wherein adjusting the magnitude of an included angle increases light radiation upon the inner surface of the reflector structure component, wherein the reflective material is a plastic material.

5. The indirect lighting fixture with symmetrical light source of claim 1, wherein the beta angle is between or equal to 90° and 180° with an optical lens.

6. The indirect lighting fixture with symmetrical light source of claim 5, wherein the light source assembly is covered with a layer of diffusion cover that is configured to reduce yellow light edges or colorful light edges in the side of the light outlet.

7. The indirect lighting fixture with symmetrical light source of claim 5, wherein the light emitting center line of the LED of the light source assembly is covered by a lens or without a lens is below the line between the center point of the LED light source of the light source assembly and the center apex of the cross-section of the reflective structure component.

8. An indirect lighting fixture with a symmetrical light source comprising:

a. a light source assembly, wherein the light source assembly is configured to emit light and includes a light-emitting diode (LED) connected to an electrical circuit, wherein the light source assembly has a certain angle of inclination to correspond to reflective structures with different depths and inner radians, wherein light points of the light source assembly are symmetrically distributed with a two-way symmetry, the two-way symmetry a left and right symmetry or an up and down symmetry, b. a reflector structure component, wherein the reflector structure component has a semi-enclosed reflective structure made of reflective material and having an inner surface with light reflective and diffuse reflective properties, wherein on one side of the inner surface is the light outlet, and the other side of the inner surface has a certain depth according to different types of lighting fixtures such that the reflector structure may be formed as a dome or an arch, and wherein differing heights or slopes are spliced under the dome or arch, wherein straight or beveled sides add depth;

c. a bottom structure component, wherein the bottom structure component constitutes the installation structure and appearance of a bottom, wherein the bottom structure component is configured for installing and fixing the light source assembly at a certain angle is designed with corresponding shading structures according to the principle that direct light from the light source assembly does not directly emit from the light source assembly, achieving a fully indirect lighting effect; and d. an appearance structure component, wherein the appearance protects and installs the reflector structure component, wherein an apparent structure of employment is a part of the indirect lighting fixture with symmetrical light source, wherein the light emitting center line of the LED of the light source assembly is below the line between the center point of the LED light source of the light source assembly and the center apex of the cross-section of the reflective structure component, wherein two lines are within a slope angle is lambda angle between or equal to 0° to 45°, wherein the center emitting line of the LED of the light source assembly is within an angle range to optimize light output effect, wherein all light emitting centerlines of all the LED chips pass through the centerline of the cross-section of the reflective structure component to the other side of the centerline, and the lambda angle formed is within the range of greater than or equal to 0° and less than 45°, thereby realizing the symmetry and uniform cross lighting, whereby this design allows the light rays within the light emission angle α of the LED point light sources to achieve a maximum range of effective light emission and be reflected.

9. The indirect lighting fixture with symmetrical light source of claim 8, wherein a shape of the inner surface of the reflector structure component varies.

10. The indirect lighting fixture with symmetrical light source of claim 8, wherein the light source assembly is covered with optical lens components to adjust its own light output angle and light output amplitude to achieve optimal light efficiency.

11. The indirect lighting fixture with symmetrical light source of claim 8, further including an omnidirectional symmetry, where the up, down, left, and right orientations are symmetrical to each other.

12. The indirect lighting fixture with symmetrical light source of claim 8, wherein the bottom structure component installs or fixes the light source assembly together with the appearance components.

13. The indirect lighting fixture with symmetrical light source of claim 8, wherein an installation angle line of the light source assembly is formed without a lens covering and a horizontal line of the light outlet of the reflector structure component forms a beta angle between or equal to 90° to 180°, wherein the inclination angle is adjusted according to the radian and depth of the inner surface of the reflector structural component.

14. The indirect lighting fixture with symmetrical light source of claim 13, wherein adjusting the magnitude of an included angle increases light radiation upon the inner surface of the reflector structure component, wherein the reflective material is a plastic material.

15. The indirect lighting fixture with symmetrical light source of claim 8, wherein an optical lens covers the light source assembly, wherein the maximum light output angle α and the light output line of the light source assembly is adjustable according to the requirements of light effect, different angles and light output directions, wherein a placement position and placement angle which is a beta angle of the light source assembly is flexible.

16. The indirect lighting fixture with symmetrical light source of claim 15, wherein the light source assembly is covered with the optical lens and kept parallel to the horizontal line of the light outlet of the bottom structure component, wherein the placement angle which is the beta angle equals 180°.

17. The indirect lighting fixture with symmetrical light source of claim 15, wherein the placement angle is a tilt angle which is a beta angle and is greater than 90° and less than or equal to 180°.

18. The indirect lighting fixture with symmetrical light source of claim 8, wherein the light source assembly is covered with a layer of diffusion cover that is configured to reduce yellow light edges or colorful light edges in the side of the light outlet.

* * * * *